(No Model.)
E. B. CUTTEN.
ELECTRODE FOR VOLTAIC CELLS.
No. 510,901. Patented Dec. 19, 1893.
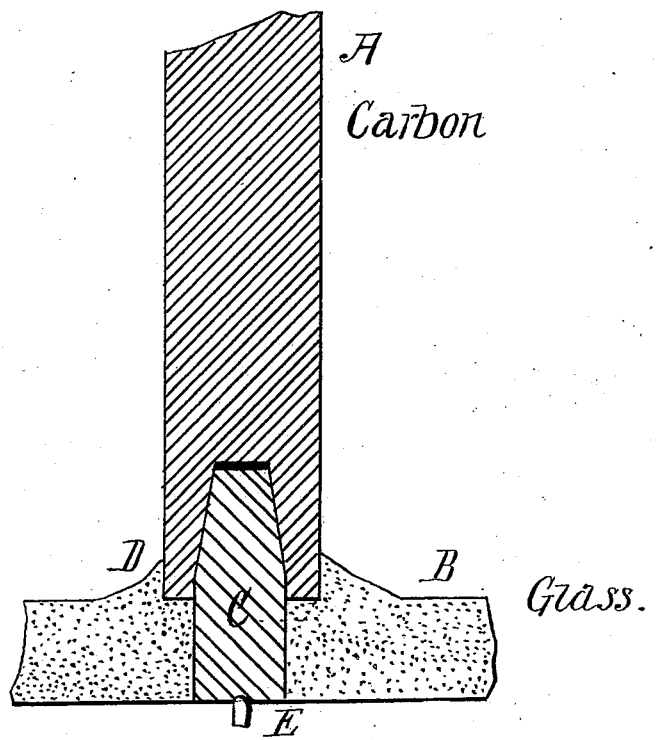
Witnesses.
Inventor.
Elisha B. Cutten
by Park Benjamin
his Attorney

UNITED STATES PATENT OFFICE.

ELISHA BARTON CUTTEN, OF NEW YORK, N. Y.

ELECTRODE FOR VOLTAIC CELLS.

SPECIFICATION forming part of Letters Patent No. 510,901, dated December 19, 1893.

Application filed May 1, 1893. Serial No. 472,487. (No model.)

*To all whom it may concern:*

Be it known that I, ELISHA BARTON CUTTEN, of the city, county, and State of New York, have invented a new and useful Improvement in Electrodes for Voltaic Cells, of which the following is a specification.

In another application for Letters Patent, Serial No. 467,926, filed by me March 28, 1893, I have fully described and claimed the construction of a carbon electrode, consisting substantially of a mass of carbon, a support therefor, and a wedge-shaped or conical pin, also of carbon. This pin is received in the support and is also driven into a suitable opening in the end of the carbon electrode, so that it serves as a means of attaching the carbon electrode and its support together. Both the carbon pin and the main body of carbon in which it is received are described in my aforesaid application as impregnated with paraffine.

The object of my present invention is to provide an efficient means of connecting the carbon electrode to its support, and also of protecting the joint between electrode and support; and my said invention consists in the combination of said carbon and a support constructed of glass, to which support the carbon is united by fusing the material of said support.

In the accompanying drawing is represented a sectional view of my invention.

A represents the main body of carbon which constitutes the electrode. It is made preferably in the form of a bar of any suitable size. Inasmuch as my invention is more particularly applicable to electrolytic cells in which aqueous solutions in large quantities are electrolyzed, the carbon A in such a cell would be from two to three feet in length by some four inches in thickness, and in a single cell many such carbon electrodes might be used.

B is a flat plate or support constructed of glass.

C is a tapered rod or pin which enters through an opening in the glass support B and is driven into a conical recess in the carbon A. This pin, with a carbon A two or three feet long, would be about nine inches in length by one inch in diameter. As described in my aforesaid prior application, I may impregnate the pin C and the part of the carbon electrode A immediately surrounding the same with paraffine; but it is not absolutely necessary to do this when my present invention is employed.

In order to secure the carbon electrode A to the glass plate B, I place the two in contact, and then by means of a blow-pipe or any other suitable means fuse the material of said plate B around the base of the carbon. The molten glass acts as a cement, and firmly binds the carbon electrode to the plate B. While it is convenient to use the material of the plate B for this purpose, it is not essential to do so; because, obviously, molten glass may be poured around the base of the carbon A, which will combine with the glass of the plate; or pieces of glass may be heaped around the base of said carbon, and then melted by means of a blow-pipe, all of the glass then fusing together. I find, in practice, that the molten glass adheres very firmly to the carbon A, and thus binds it rigidly in place. At the same time, a close and tight joint is formed, which completely prevents the entrance of the electrolytic liquid. The pin C may be inserted in the carbon A first and afterward placed in an aperture in the plate B; or, the carbon may be sealed to the plate B directly above the aperture therein and the pin C afterward driven into place. The mode of assembling these parts is not material. The conductor carrying the current to the electrode A is connected to the pin C, as shown at E.

I claim—

1. The combination in a voltaic cell of an electrode of carbon and a glass support therefor; the said electrode being secured to the support by glass, substantially as described.

2. The combination in a voltaic cell of an electrode of carbon and a glass support therefor, the said electrode being secured to the support by the material of said support at the joint or place of contact, substantially as described.

3. The combination in a voltaic cell of a glass support, an electrode of carbon, cemented at one end to said support by means of glass, and a carbon pin passing through said support and entering said carbon, substantially as described.

ELISHA BARTON CUTTEN.

Witnesses:
H. R. MOLLER,
M. BOSCH.